United States Patent
Nguyen Canh et al.

(10) Patent No.: US 12,088,801 B2
(45) Date of Patent: Sep. 10, 2024

(54) METHOD AND APPARATUS FOR TEMPORAL FILTER IN VIDEO CODING

(71) Applicant: TENCENT AMERICA LLC, Palo Alto, CA (US)

(72) Inventors: Thuong Nguyen Canh, Palo Alto, CA (US); Guichun Li, Milpitas, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/446,080

(22) Filed: Aug. 26, 2021

(65) Prior Publication Data
US 2023/0084472 A1    Mar. 16, 2023

(51) Int. Cl.
*H04N 19/117*    (2014.01)
*H04N 19/105*    (2014.01)
(Continued)

(52) U.S. Cl.
CPC ......... *H04N 19/117* (2014.11); *H04N 19/105* (2014.11); *H04N 19/124* (2014.11);
(Continued)

(58) Field of Classification Search
CPC .. H04N 19/117; H04N 19/105; H04N 19/124; H04N 19/14; H04N 19/172; H04N 19/176; H04N 19/182; H04N 19/51
See application file for complete search history.

(56) References Cited

U.S. PATENT DOCUMENTS 10,652,552 B1 * 5/2020 Young .................. H04N 19/86
10,986,363 B2    4/2021 Terterov et al.
(Continued)

FOREIGN PATENT DOCUMENTS

EP    3819860 A1    5/2021

OTHER PUBLICATIONS

P. Wennersten et al., "AHG10: Encoder-only GOP-based temporal filter", Joint Video Experts Team (JVET) of ITU-T SG 16 WP 3 and ISO/IEC JTC 1/SC 29/WG 11, Document JVET-O0549-v2, 15th Meeting: Gothenburg, SE, Jul. 3-12, 2019 (4 pages).
(Continued)

*Primary Examiner* — Michael J Hess
*Assistant Examiner* — Naod W Belai
(74) *Attorney, Agent, or Firm* — ArentFox Schiff LLP

(57) ABSTRACT

Aspects of the disclosure provide methods and apparatuses for video processing. In some examples, an apparatus for video processing includes processing circuitry. The processing circuitry determines one or more parameters of a temporal filter based on video contents in an uncompressed video. The uncompressed video includes a sequence of frames. Then, the processing circuitry applies the temporal filter with the determined parameter on a first pixel in a first frame to determine a filtered value for the first pixel based on the first pixel in the first frame and second pixels in a group of reference frames for the first frame. Further, the processing circuitry encodes a filtered video that includes the filtered value for the first pixel in the first frame to generate a coded video bitstream that carries the filtered video.

20 Claims, 19 Drawing Sheets

(51) Int. Cl.
*H04N 19/124* (2014.01)
*H04N 19/14* (2014.01)
*H04N 19/172* (2014.01)
*H04N 19/176* (2014.01)
*H04N 19/182* (2014.01)
*H04N 19/51* (2014.01)
*H04N 19/142* (2014.01)

(52) U.S. Cl.
CPC .......... *H04N 19/14* (2014.11); *H04N 19/172* (2014.11); *H04N 19/176* (2014.11); *H04N 19/182* (2014.11); *H04N 19/51* (2014.11); *H04N 19/142* (2014.11)

(56) References Cited

U.S. PATENT DOCUMENTS

| 2010/0027665 | A1 | 2/2010 | Pinhasov et al. | |
|---|---|---|---|---|
| 2012/0063513 | A1* | 3/2012 | Grange | H04N 19/194 375/E7.125 |
| 2016/0037058 | A1* | 2/2016 | Silverstein | H04N 23/80 348/241 |
| 2018/0343448 | A1 | 11/2018 | Possos et al. | |
| 2020/0162741 | A1* | 5/2020 | Byun | H04N 19/139 |
| 2023/0084472 | A1* | 3/2023 | Nguyen Canh | H04N 19/14 375/240.03 |

OTHER PUBLICATIONS

P. Wennersten et al., "[AHG10] GOP-based temporal filter improvements", Joint Video Experts Team (JVET) of ITU-T SG 16 WP 3 and ISO/IEC JTC 1/SC 29, Document JVET-U0056-v2, 21st Meeting, by teleconference, Jan. 6-15, 2021 (4 pages).

Shen-Chuan Tai et al., "A Fast Method For Image Noise Estimation Using Laplacian Operator and Adaptive Edge Detection", IEEE, ISCCSP 2008, Malta, pp. 1077-1081, Mar. 12-14, 2008 (5 pages).

Joint Collaborative Team on Video Coding (JCT-VC) Contribution, "ALTREF Pictures—Temporal filtering Appendix" (9 pages).

International Search Report issued Feb. 17, 2022 in Application No. PCT/US2021/062653 pp. 1-10.

Supplementary European Search Report issued Feb. 6, 2024 in Application No. 21989984.7, pp. 1-11.

Office Action received for Chinese Patent Application No. 202180038238.1, mailed on Jun. 27, 2024, 15 pages (7 pages of English Translation and 8 pages of Original Document).

* cited by examiner

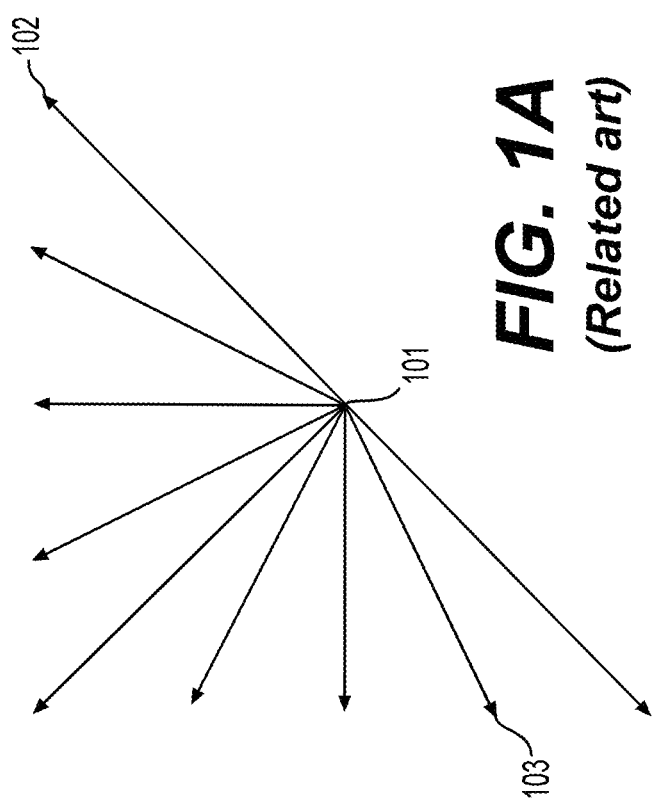
FIG. 1A *(Related art)*

| $i$ | $Sr(i,12)$ |
|---|---|
| 1 | 0.5 |
| 2 | 0.55 |
| 3 | 0.6 |
| 4 | 0.7 |
| 5 | 1.06 |
| 6 | 1.35 |
| 7 | 1.35 |
| 8 | 1.06 |
| 9 | 0.7 |
| 10 | 0.6 |
| 11 | 0.55 |
| 12 | 0.5 |

| $i$ | $Sr(i,6)$ |
|---|---|
| 1 | 0.97 |
| 2 | 0.7 |
| 3 | 0.6 |
| 4 | 0.55 |
| 5 | 0.5 |
| 6 | 0.45 |

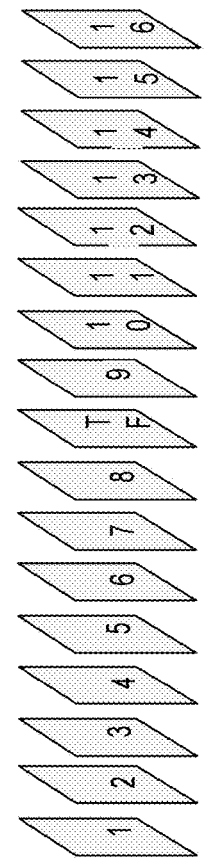
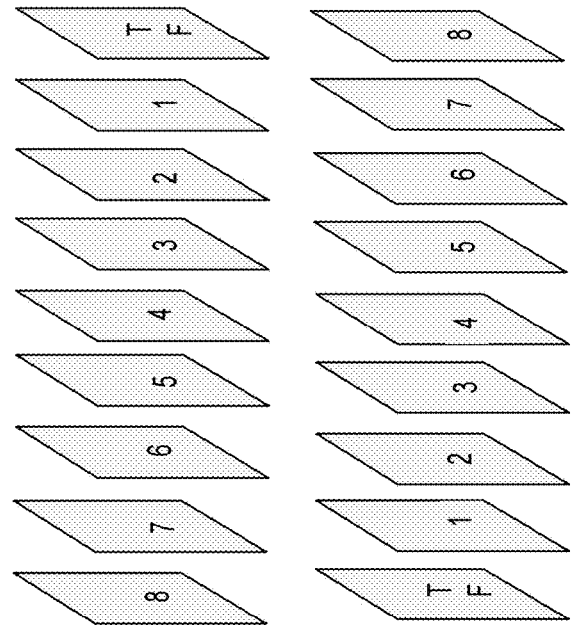
FIG. 13B
FIG. 13A

METHOD AND APPARATUS FOR TEMPORAL FILTER IN VIDEO CODING

TECHNICAL FIELD

The present disclosure describes embodiments generally related to temporal filtering in video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video processing. In some examples, an apparatus for video processing includes processing circuitry. The processing circuitry determines one or more parameters of a temporal filter based on video contents in an uncompressed video. The uncompressed video includes a sequence of frames. Then, the processing circuitry applies the temporal filter with the determined parameter on a first pixel in a first frame to determine a filtered value for the first pixel based on the first pixel in the first frame and second pixels in a group of reference frames for the first frame. Further, the processing circuitry encodes a filtered video that includes the filtered value for the first pixel in the first frame to generate a coded video bitstream that carries the filtered video. The first frame is a to be temporal filtered frame, and the first pixel is a to be temporal filtered pixel.

In some examples, the one or more the parameters of the temporal filter include at least one of a number of reference frames in the group of reference frames, a filter strength, and an enabling/disabling decision of the temporal filter on a block including the first pixel. In some examples, the video contents include at least one of a scene change, a noise level of a frame, a signal to noise ratio of a block, and a pixel variance in a block.

In an example, the processing circuitry determines a number of reference frames in the group of reference frames based on a noise level of the first frame.

In another example, the processing circuitry determines a frame level filtering strength based on a noise level of the first frame.

In another example, the processing circuitry determines at least one of a filtering strength and a quantization parameter for a block that includes the first pixel based on a signal to noise ratio of the block.

In another example, the processing circuitry makes an enabling/disabling decision for applying the temporal filter to a block in the first frame based on a complexity of the block.

In some examples, the processing circuitry determines the group of reference frames that are in a same scene as the first frame. Then, the processing circuitry derives, for a reference frame in the group of reference frames, a motion compensated reference frame based on motion estimation between the reference frame and the first frame. The processing circuitry can determine the filtered value for the first pixel at least partially based on a co-located pixel for the first pixel in the motion compensated reference frame. In some examples, the processing circuitry determines the filtered value for the first pixel based on at least a non co-located pixel for the first pixel in the motion compensated reference frame. In an example, the processing circuitry determines the filtered value based on a first number of non co-located pixels in a first motion compensated reference frame and a second number of non co-located pixels in a second motion compensated reference frame, the first motion compensated reference frame has a smaller temporal distance to the first frame than the second motion compensated reference frame, and the first number of non co-located pixels is larger than the second number of non co-located pixels.

Aspects of the disclosure also provide a non-transitory computer-readable medium storing instructions which when executed by a computer for video processing cause the computer to perform the method for video processing.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

FIGS. 13A-13B show some other examples of lookup tables that define the reference filter strength.

DETAILED DESCRIPTION OF EMBODIMENTS

Figure 1B:
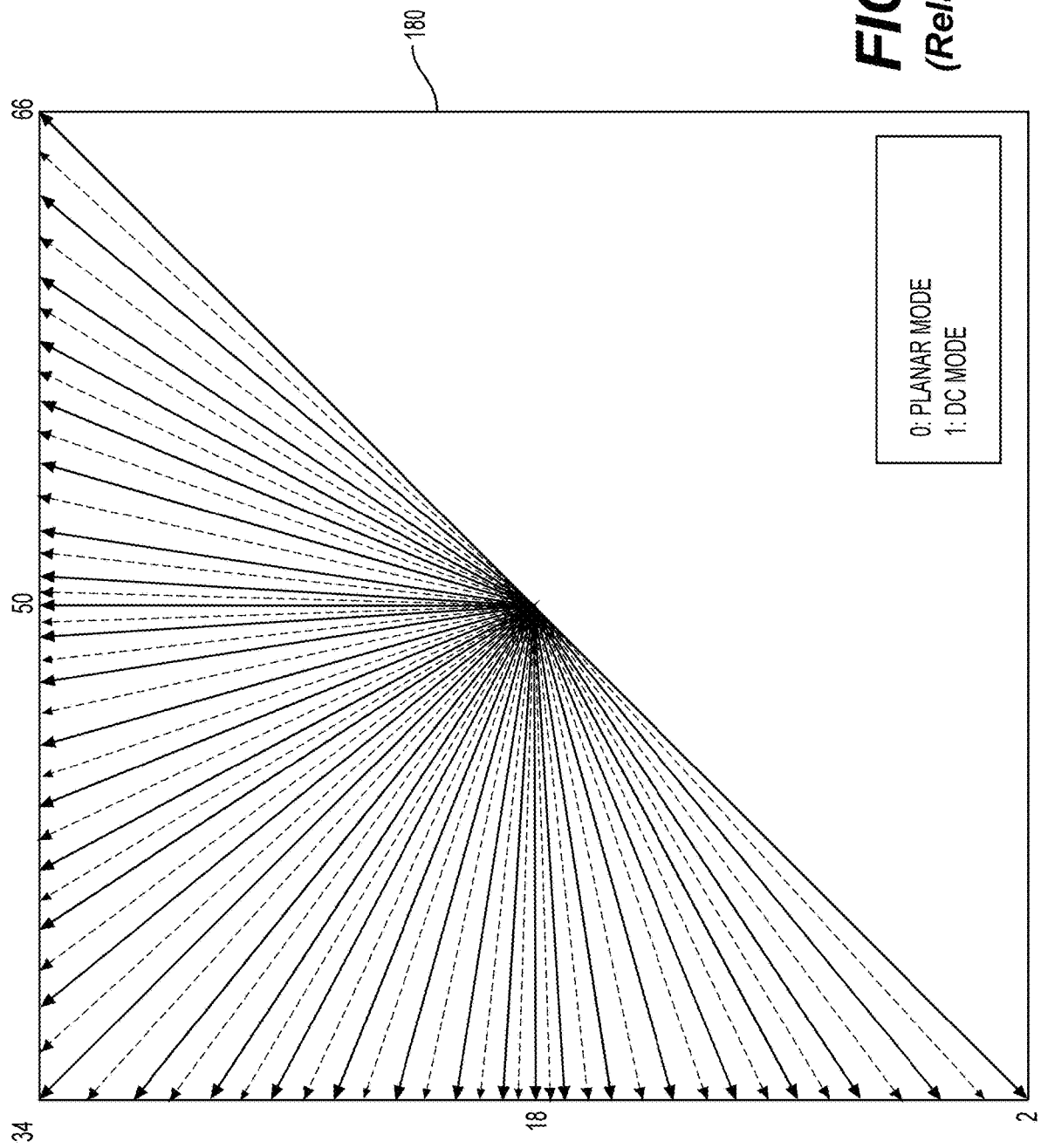
FIG. 1B is an illustration of exemplary intra prediction directions.
Figure 2:
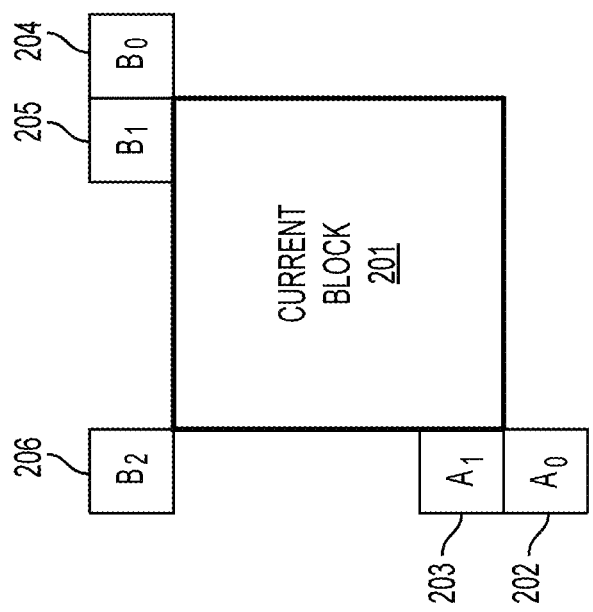
FIG. 2 is a schematic illustration of a current block and its surrounding spatial merge candidates in one example.
Figure 3:
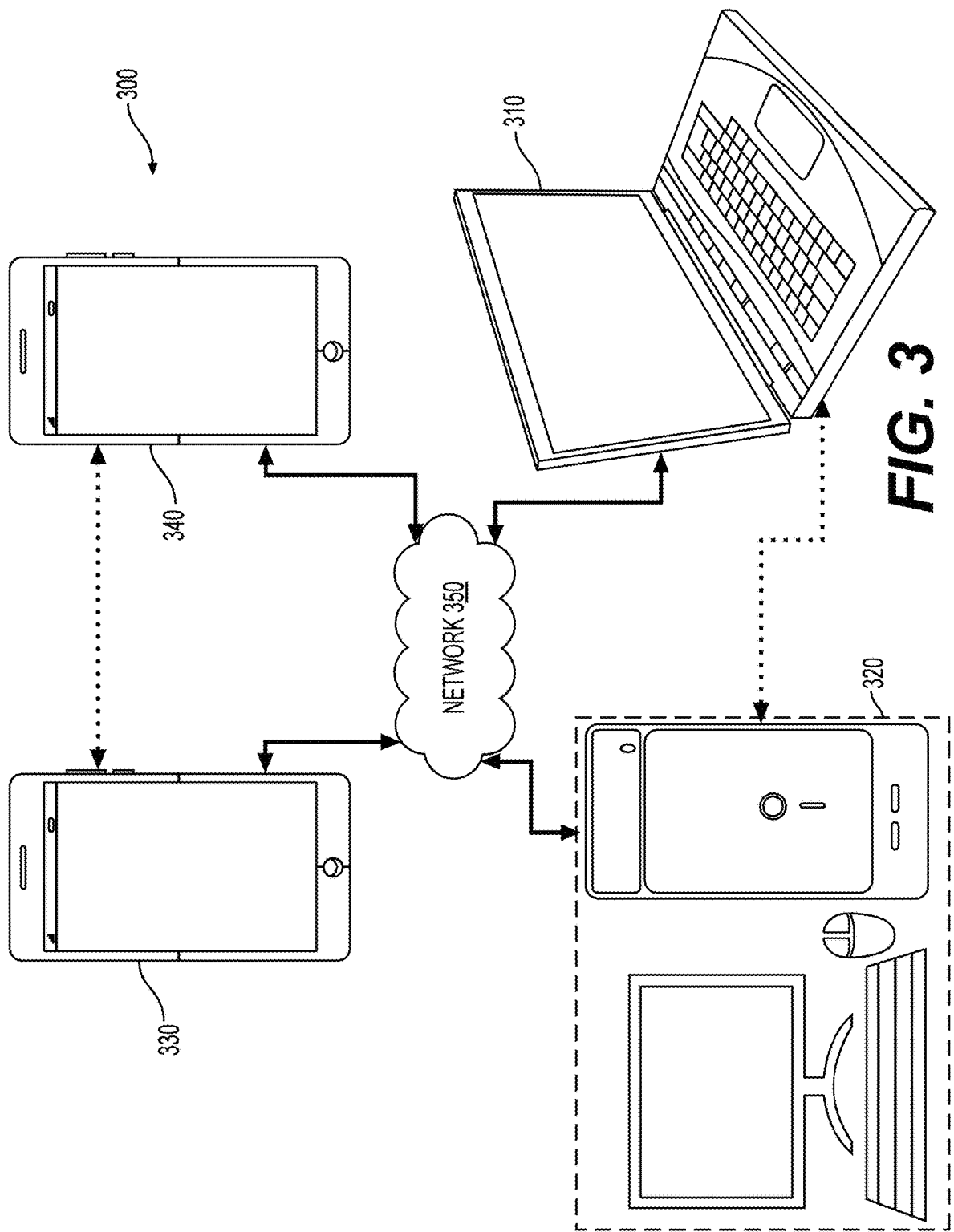
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
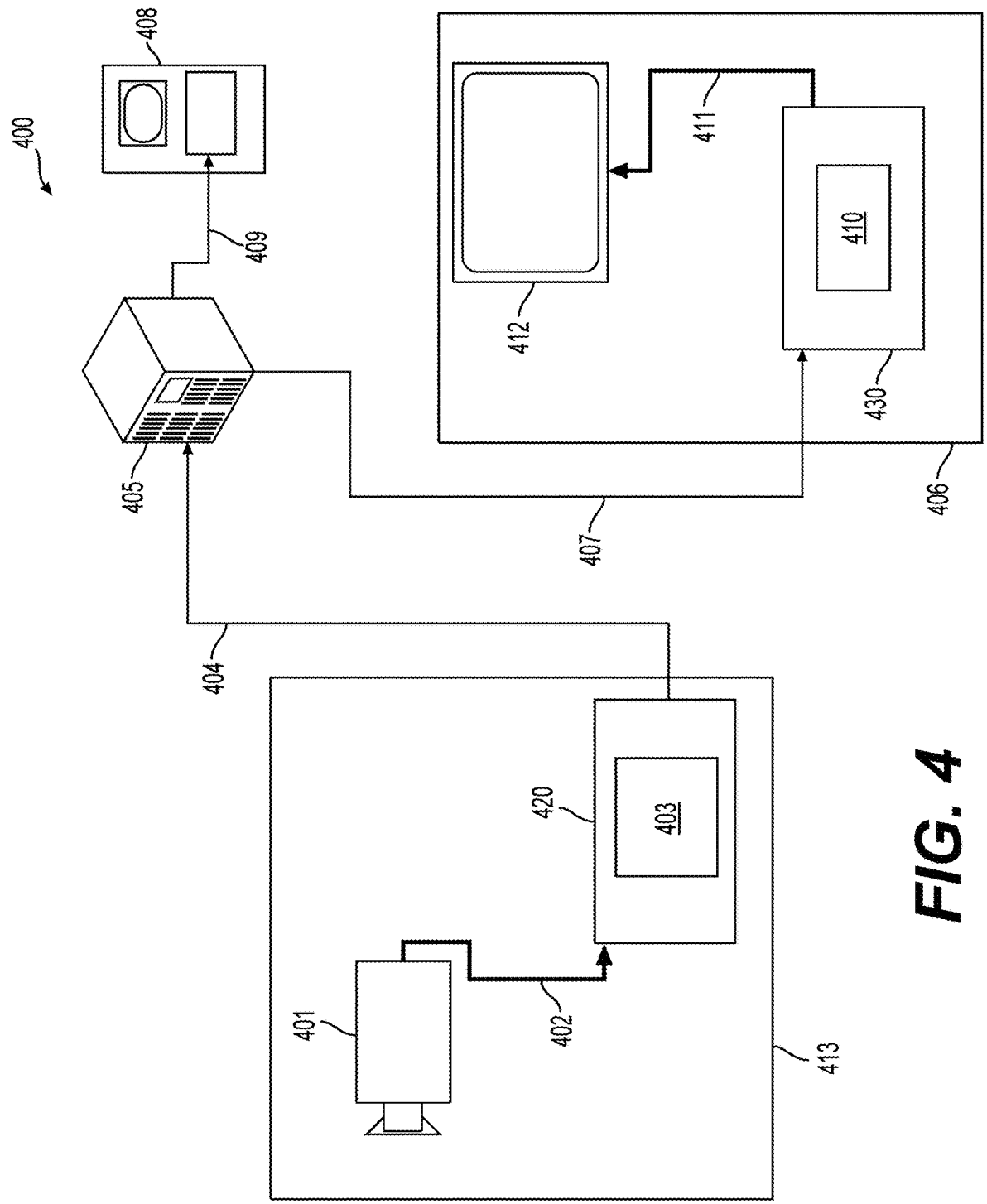
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
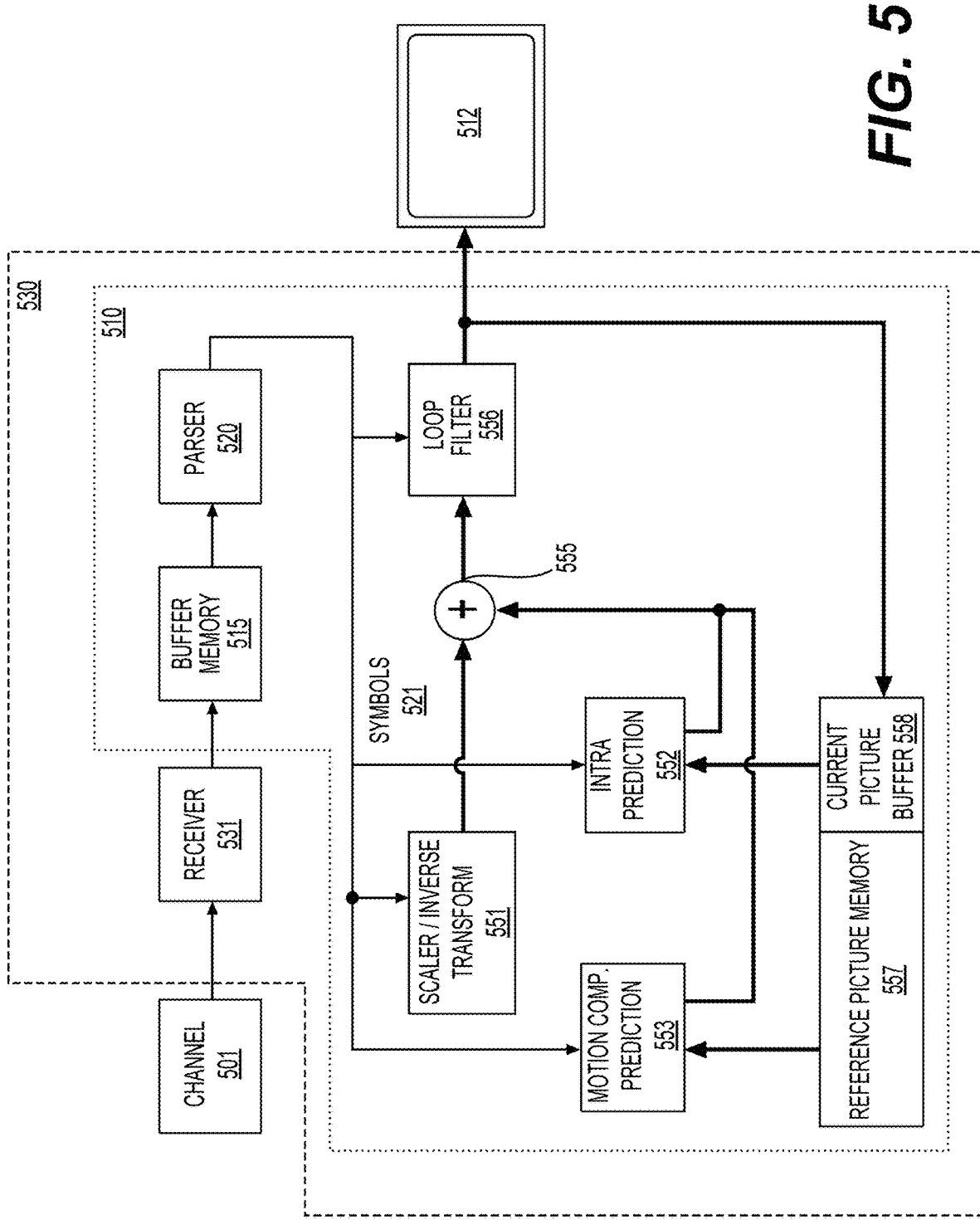
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
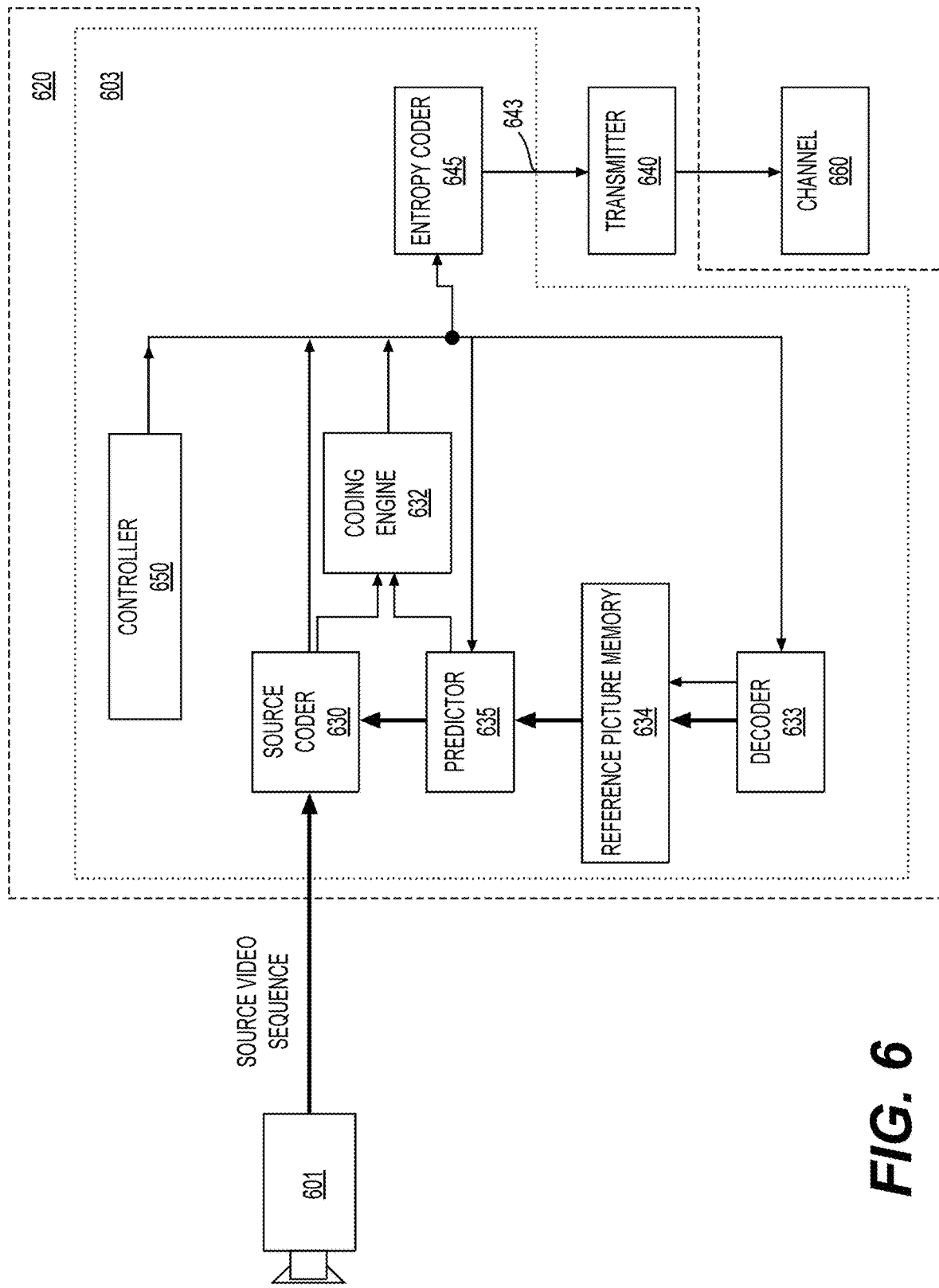
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
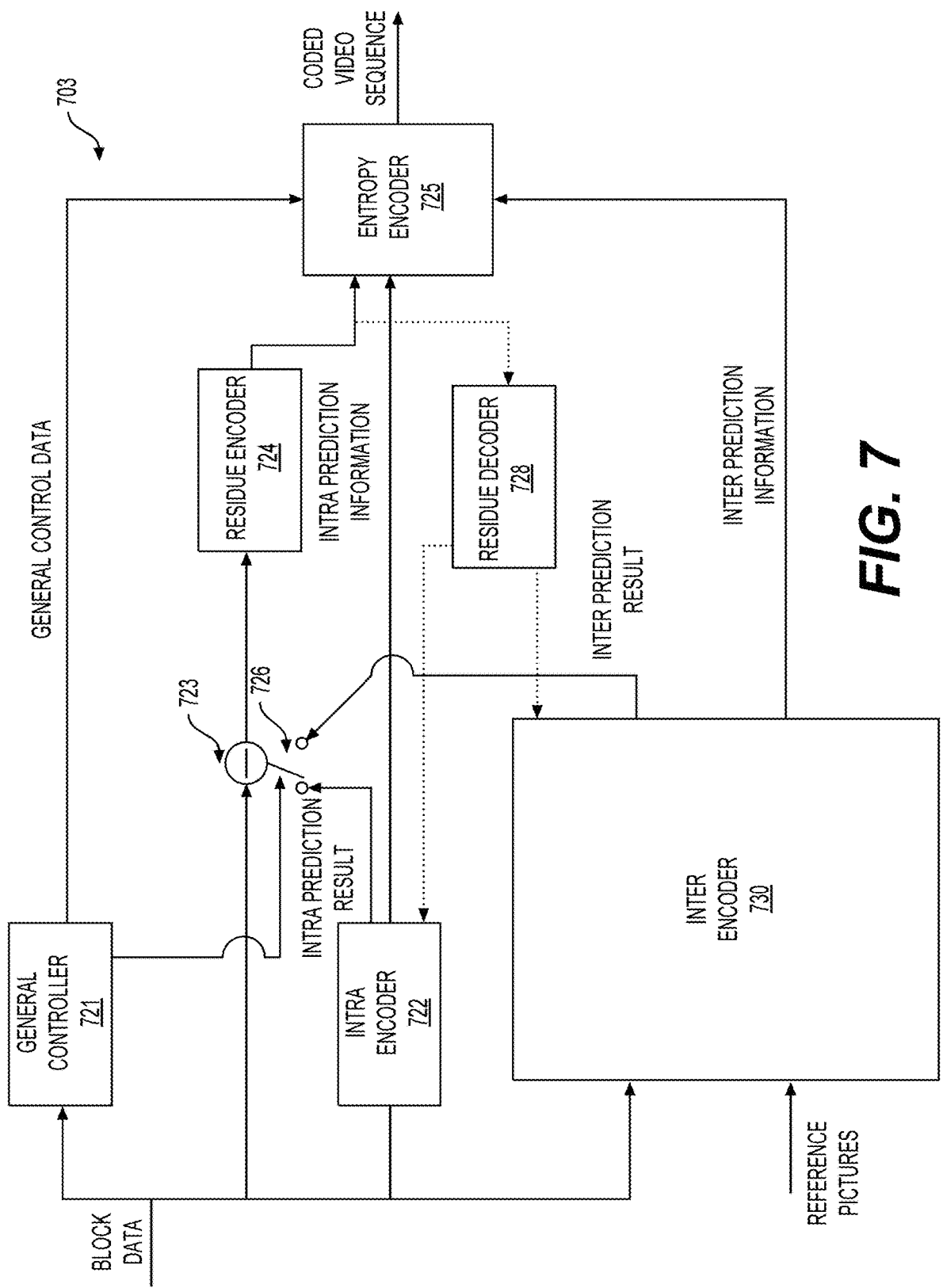
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
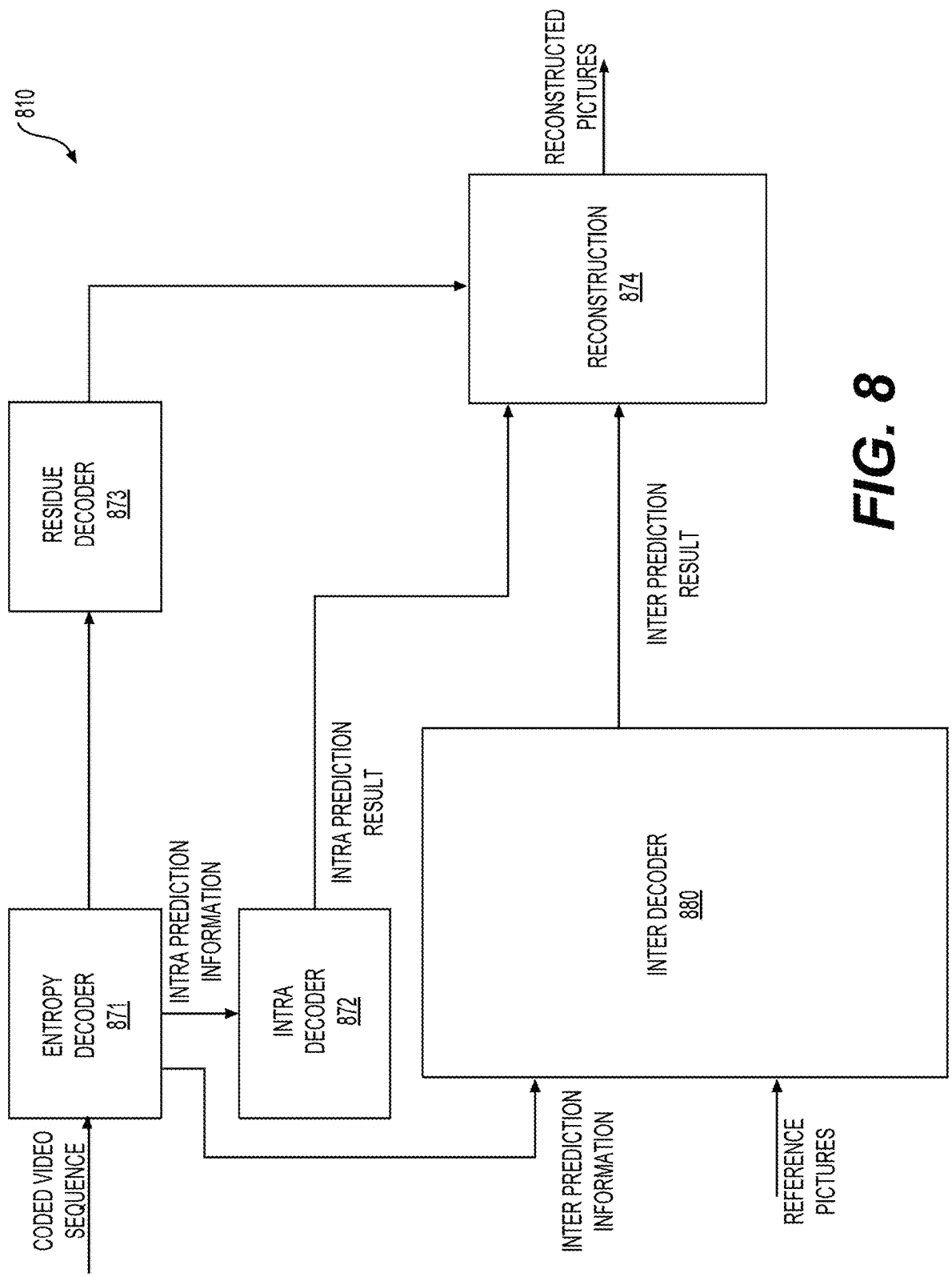
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Descriptions for this Application.

Aspects of the disclosure provide techniques for temporal filtering. Temporal filtering is used at the encoder side as a preprocessing step.

Figure 9:
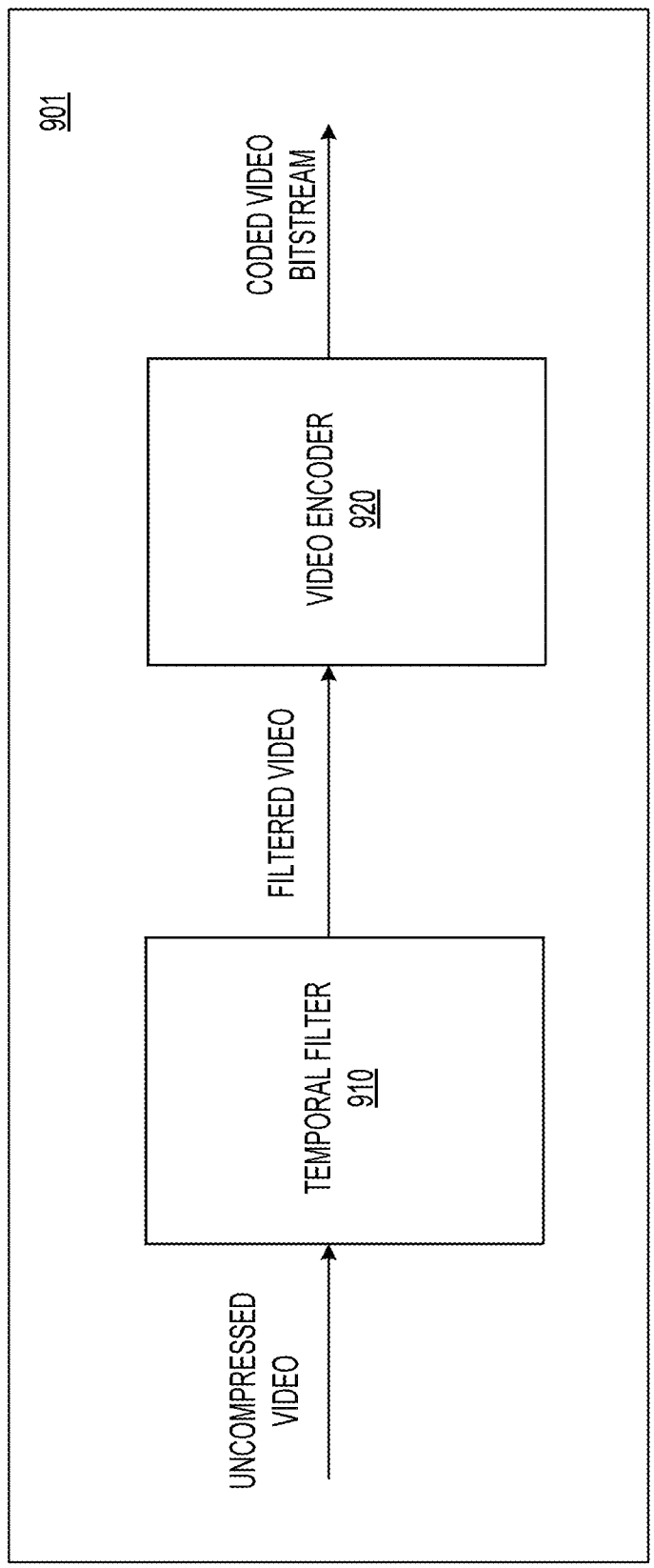
FIG. 9 shows an encoding device according to some aspects of the disclosure.

FIG. 9 shows an encoding device (901) according to some aspects of the disclosure. The encoding device (901) can be any suitable device, such as a desktop computer, a server computer, a laptop computer, a tablet computer, a sensor device, a video capture device, a camera, an embedded computing device, and the like. The encoding device (901) can generate a coded video bitstream that carries a video. In an example, the encoding device (901) is implemented in an electronic device, such as the electronic device (420), the electronic device (620), and the like.

In the FIG. 9 example, the encoding device (901) includes a temporal filter (910) and a video encoder (920). The temporal filter (910) can operate on an uncompressed video and generate a filtered video. The video encoder (920) can encode the filtered video and output the coded video bitstream that carries the filtered video. In some examples, the temporal filter (910) and the video encoder (920) are respectively implemented by circuitry. In some examples, the temporal filter (910) and the video encoder (920) are respectively implemented by a processor executing software instructions. The temporal filter (910) can be configured according to the following description.

According to some aspects of the disclosure, the temporal filter (910) can operate on a current picture frame (also referred to as a temporal filter frame or TF frame) in a video based on other frames in the video, such as neighboring frames before the TF frame in the video, neighboring frames after the TF frame in the video. The temporal filter (TF) (910) can increase the similarity between current TF frame and neighboring frames in the filtered video. When the filtered video is encoded, the similarity between the current TF frame and neighboring frames can reduce the residual information and increase coding efficiency in some examples.

In some examples (e.g., VVC test model (VTM)), temporal filtering is applied for each picture at interval picture order count (POC) of 16 or 8. For example, up to 4 reference frames in the forward direction and/or up to 4 reference frames in the backward direction are used to derive the weights for bilateral filtering. In some examples, the number of available reference frames is denoted by a. In an example, when the reference frames are available at one side of the TF frame, a may have a value of 4; and when the reference frames are available at both sides of the TF frame, a may have a value of 8. A sample in the TF frame at kth spatial location in the TF frame can be filtered according to Eq. (1):

$$I_n(k) = \frac{I_o(k) + \sum_{i=0}^{7} w_r(i, a, k) I_r(i, k)}{1 + \sum_{i=0}^{7} w_r(i, a, k)} \quad \text{Eq. (1)}$$

where $I_o(k)$ denotes an original pixel (sample) at spatial location k in the TF frame, $I_n(k)$ denotes the filtered pixel (sample), $I_r(i, k)$ denotes the co-located pixel (also at kth spatial location or having same coordinates after motion compensation) at ith motion compensated reference frame (i denotes the index of the reference frame or the index of the motion compensated reference frame). $I_r$ denotes a motion compensated reference frame that is derived by doing motion estimation between the TF frame and an original reference frame then motion compensation from the original reference frame. $w_r(i, a, k)$ denotes weight for the ith motion compensated reference frame (with a number of available reference frames) at the spatial location k in the TF frame. In an example, the weight can be derived according to Eq. (2):

$$w_r(i, a, k) = bw \cdot s_o \cdot s_r(i, a) \cdot e^{-\frac{\Delta I(i,k)^2}{sw \cdot \sigma_i(QP)^2}} \quad \text{Eq. (2)}$$

where the parameter bw denotes a base weight, and has a value of 0.4 in an example. The parameter $s_o$ denotes a basic filter strength, and can be decided based on the interval POC. In an example, if the interval POC is divisible by 16, $s_o$ has a value of 1.5; else if the interval POC is divisible by 8, $s_o$ has a value of 0.95. The parameter $s_r$ (i, a) denotes the reference filter strength and can be defined by a lookup table, and will be discussed with reference to FIGS. 10A-10B. The parameter $\Delta I(i, k)$ denotes the pixel value difference between original pixel at spatial location k and its co-located pixel in ith motion compensated reference frame. The parameter sw denotes the sigma base weight of 2, for example having a constant value of 2. The parameter $\sigma_i(QP)$ can be determined by Eq. (3):

$$\sigma_i(QP) = 3 \times (QP - 10) \quad \text{Eq. (3)}$$

where QP denotes the slice quantization parameter. In some examples, the base weight bw and sigma weight sw can be variables and can be adjusted adaptively for each block (e.g., 8×8 (samples) block) based on block error and a block frequency weighting.

Figure 10:
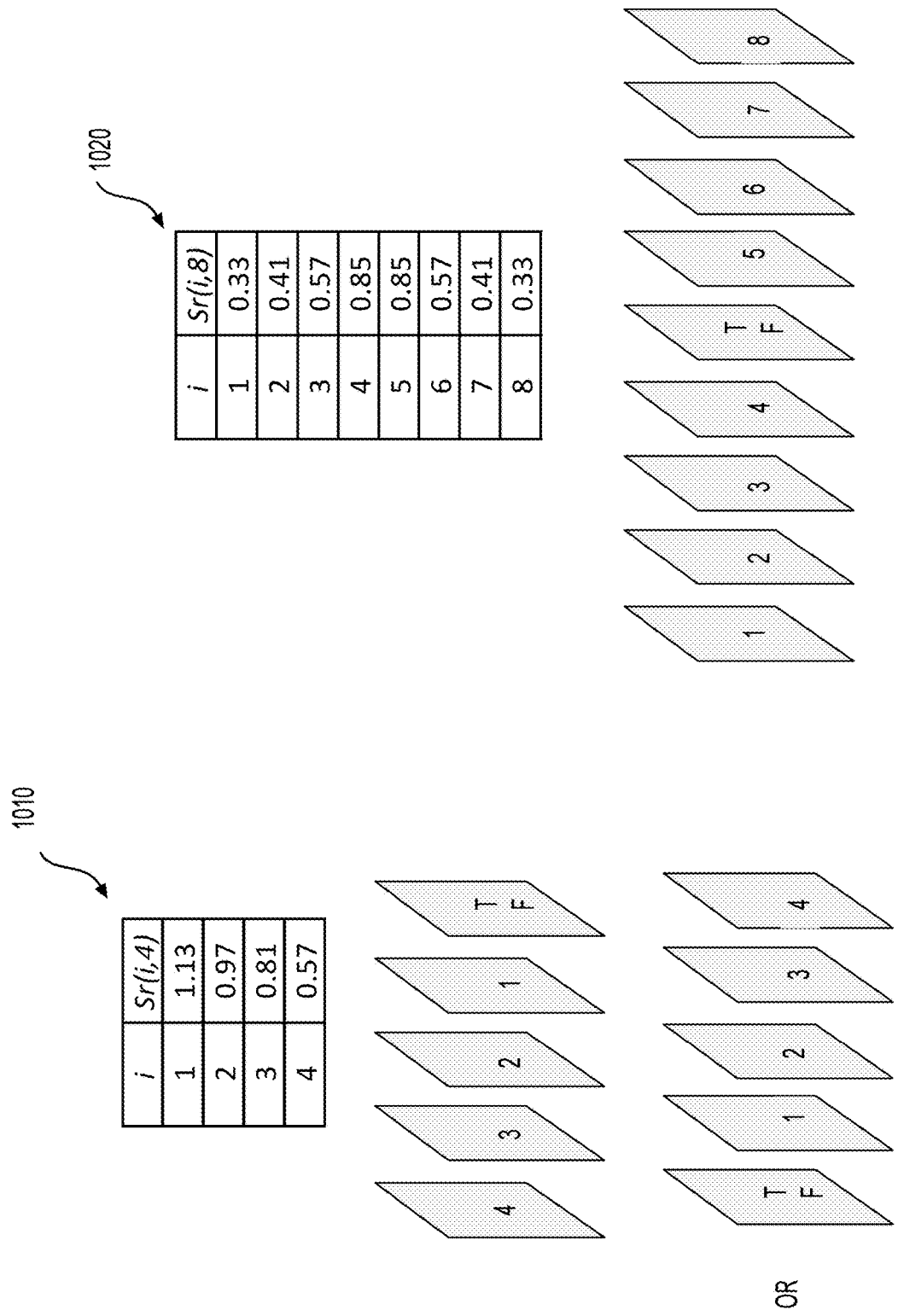
FIGS. 10A-10B show examples of lookup tables that define the reference filter strength.

FIGS. 10A-10B show examples of lookup tables that define the reference filter strength $s_r(i, a)$. In an example, FIG. 10A shows a lookup table (1010) that can be used to determine the value of the reference filter strength $s_r(i, a)$ when the number of available reference frames a has a value of 4. For example, the reference frames are available on one side of the TF frame, such as before the TF frame or after the TF frame.

In another example, FIG. 10B shows a lookup table (1020) that can be used to determine the value of the reference filter strength $s_r(i, a)$ when the number of available reference frames a has a value of 8. For example, 4 reference frames are available before the TF frame and 4 reference frames are available after the TF frame.

In some examples (e.g., AOMedia video (AV1), scalable video technology for AV1 (SVT-AV1)), temporal filter can be used to filter key frames, and can be used to generate alternative reference frames (denoted by ALTREFs). ALTREFs are non-displayable picture frames that are used as reference for other picture frames. The pixel weights can be calculated differently compared to temporal filter in VTM. In an example, temporal filter in SVT-AV1 adaptively selects filter strength based on the noise information, such as based on Eq. (4)

$$\text{altref\_strength} = \begin{cases} \text{altref\_strength} - 2 & \text{if } \sigma_n < 0.75 \\ \text{altref}_{strength} - 1 & \text{elseif } \sigma_n < 1.75 \\ \text{altref\_strength} & \text{elseif } \sigma_n < 4.0 \\ \text{altref\_strength} + 1 & \text{otherwise} \end{cases} \quad \text{Eq. (4)}$$

where altref_strength denotes the filter strength and $\sigma_n$ denotes a noise level for the current TF frame.

In some examples, a parameter altref_nframes denotes the number of alternative reference frames, and is adjustable by removing reference with a significant illumination change. In an example, a reference picture will be removed if the difference in accumulated luminance histogram is significant different from a given threshold that is denoted by ahd. In an example, the threshold is calculated according to Eq. (5):

$$ahd = 0.5 \times W \times H \quad \text{Eq. (5)}$$

where W denotes the width of the current frame and H denotes the height of the current frame.

According to some aspects of the disclosure, certain techniques, such as scene cut detection, noise estimation, simple scene (content) detection, and the like can be used in the temporal filter (910). Scene cut detection is a technique to detect whether a scene change is happening. A scene change happens in a video when the content is changed from one scene to another scene. Scene change can result significant change in the contents, and can be detected by evaluating the difference between neighbouring pictures.

In some examples, noise estimation is a technique that estimates the noise level via evaluating gradient energy of a picture. Further, local contents, such as edges, smooth areas, or textures can be further utilized to derive noise level with higher accuracy.

Figure 11:
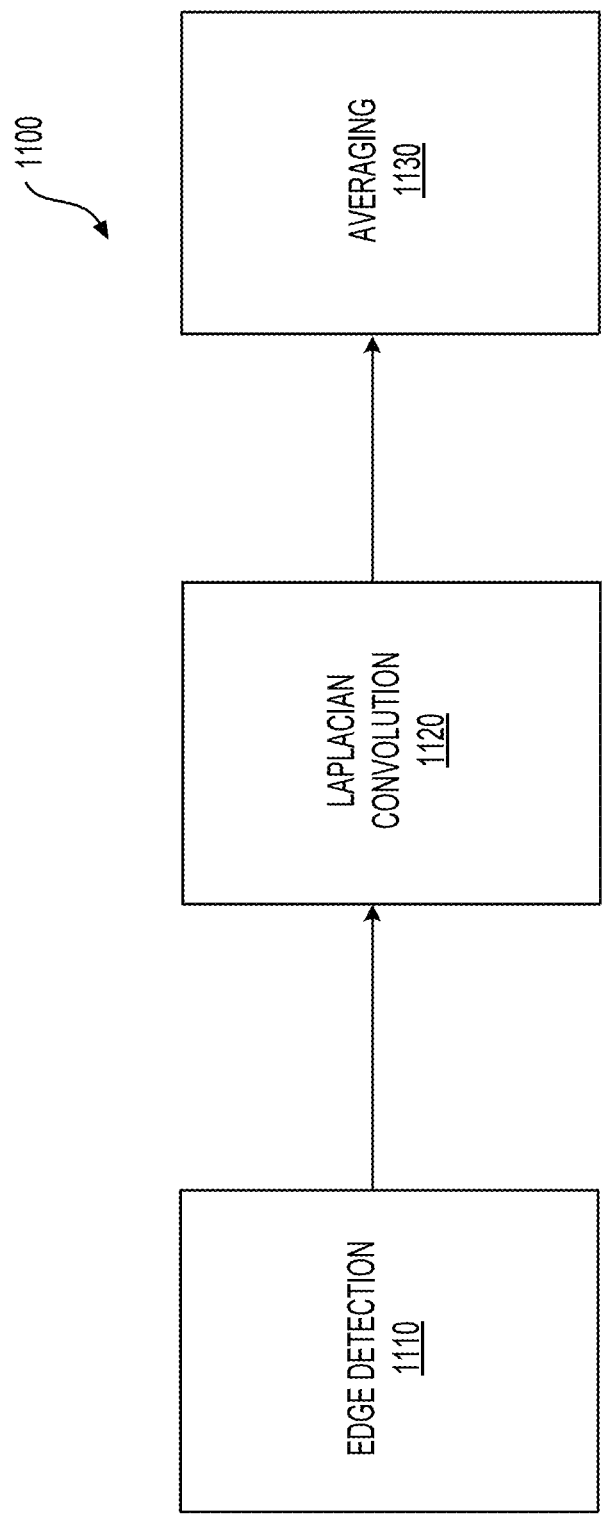
FIG. 11 shows a process flow for noise estimation according to some examples.

FIG. 11 shows a process flow (1100) for noise estimation according to some examples. The process flow (1100) includes an edge detection step (1110), a Laplacian convolution step (1120) and an averaging step (1130).

During the edge detection step (1110), in an example, a Sobel operation is used for edge detection in order to exclude edges from noise detection. In an example, the current picture is denoted as I, (x, y) denotes the coordinates of a pixel. The output of the Sobel operation can be described according to Eq. (6):

$$G = \left| I(x,y) \times \begin{bmatrix} -1 & -2 & -1 \\ 0 & 0 & 0 \\ 1 & 2 & 1 \end{bmatrix} \right| + \left| I(x,y) \times \begin{bmatrix} -1 & 0 & 1 \\ -2 & 0 & 2 \\ -1 & 0 & 1 \end{bmatrix} \right| \quad \text{Eq. (6)}$$

where $\|\cdot\|$ denotes absolute operator. In an examples, an edge map is decided using a threshold $G_{th}$ for G. For example, the pixels with $G < G_{th}$ in the noise detection can be used with Laplacian operator in the Laplacian convolution step (1120). The noise level calculation by the Laplacian convolution step (1120) and the averaging step (1130) can be performed according to Eq. (7):

$$\sigma_n = \sqrt{\frac{\pi}{2}} \frac{1}{6(W-2)(H-2)} \sum_{x,y} |I(x,y) \times N| \quad \text{Eq. (7)}$$

where N is the Laplacian operator, and is defined in an example according to Eq. (8):

$$N = \begin{bmatrix} 1 & -2 & 1 \\ -2 & 4 & -2 \\ 1 & -2 & 1 \end{bmatrix} \quad \text{Eq. (8)}$$

Simple local scene (also referred to as local content) detection is a technique to detect specific scenes of certain properties, such as a blank scene, and the like in a local region (e.g., a block). In an example, blank local scene can be detected for a block with B×B pixels based on, for examples, the pixel variance, the pixel value range (e.g., a difference of a maximum pixel value and a minimum pixel value in the block, max_pixel_val—min_pixel_val), and the like.

Aspects of the disclosure provide techniques to adjust temporal filtering based on video content properties. In some examples, the temporal filtering can be adjusted in accordance with scene change. In some examples, the temporal filtering can be adjusted based on noise level and the local content of current TF frame. For example, the local content can be dark region, simple or blank region. In some examples, the temporal filtering can be adjusted to include non co-located pixels, such as neighboring pixels of the co-located pixel in a motion compensated reference frame.

According to an aspect of the disclosure, a temporal filter can be defined with various filtering parameters, and the filtering parameters of the temporal filter can be adaptively adjusted based on source video content properties. The filtering parameters that can be adaptively adjusted include but not limit to, the number of reference frames, the filter strength, and a decision to apply or not to apply the temporal filter on a block (referred to as an enable/disable decision). The video content properties include but not limit to scene change, noise level, local signal to noise ratio, and whether a local scene has small pixel variation or simple (e.g., simple local scene).

In an embodiment, the number of reference frames is adaptively determined according to the noise level of the TF frame. The available number of reference frames a on one side is referred to as reference range ar. In some examples, reference range ar is increased to be larger than 4, and the larger reference range can increase the dependency in TF frame for the group of pictures (GOP).

In an example, the reference range ar is 6. When one side of the TF frame has reference frames, 6 reference frames are available; when both sides of the TF frame have reference frames, 12 reference frames are available. The reference filter strength $s_r(i, a)$ can be defined by a lookup table.

Figure 12B:
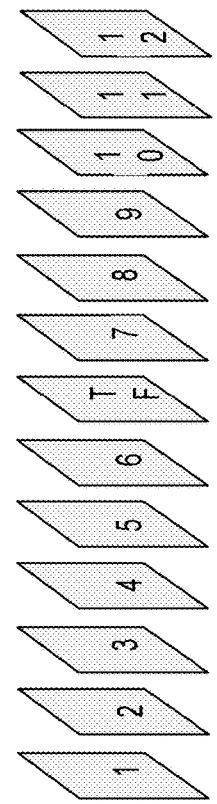
FIGS. 12A-12B show some other examples of lookup tables that define the reference filter strength.
Figure 12A:
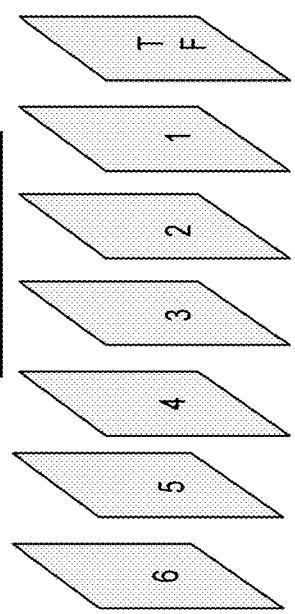

FIG. 12A shows a lookup table (1210) that is used to determine the reference filter strength when the reference range ar is 6 and reference frames are on one side of the TF frame. FIG. 12B shows a lookup table (1220) that is used to determine the reference filter strength when the reference range ar is 6 and reference frames are on both sides of the TF frame.

In an example, the reference range ar is 8. When one side of the TF frame has reference frames, 8 reference frames are available; when both sides of the TF frame have reference frames, 16 reference frames are available. The reference filter strength $s_r(i, a)$ can be defined by a lookup table.

FIG. 13A shows a lookup table (1310) that is used to determine the reference filter strength when the reference range ar is 8 and reference frames are on one side of the TF frame. FIG. 13B shows a lookup table (1320) that is used to determine the reference filter strength when the reference range ar is 8 and reference frames are on both sides of the TF frame.

In some examples, the reference range ar is adaptively adjusted based on a noise value, such as a frame level noise value denoted by $\sigma_n$. In an example, a frame level noise value $\sigma_n$ is calculated in accordance to the process flow (1100) and Eq. 6-Eq. 8. Then, the reference range ar is determined based on the frame level noise value denoted by $\sigma_n$ according to Eq. (9):

$$ar = \begin{cases} 4 & \text{if } \sigma_n \leq TH_1 \\ 6 & \text{elseif } \sigma_n \leq TH_2 \\ 8 & \text{otherwise} \end{cases} \qquad \text{Eq. (9)}$$

where $TH_1$ and $TH_2$ denote the threshold values. Specifically, if the frame level noise value $\sigma_n$ is equal or lower than $TH_1$, the reference range ar can be 4. If the frame level noise value $\sigma_n$ is higher than $TH_1$, but is equal to or lower than $TH_2$, then the reference range ar can be adjusted to be 6; and when the frame level noise value $\sigma_n$ is higher than $TH_2$, then the reference range ar can be adjusted to be 8. In an example, $TH_1$ is equal to 1 and $TH_2$ is equal to 2.

In another embodiment, the frame-level or block level filtering strength is adaptively determined based on noise level. In some examples, the filter strength (frame level or block level) is adjusted symmetrically about a value (referred to as adjusted noise factor) that is denoted $a_n$. Specifically, in an example, a noisier frame is filtered stronger by adaptively adjusting base filter strength $s_0$ by a modified weight $s_n$ (e.g., $s_0 \times s_n$), and the modified weight $s_n$ can be determined according to Eq. (10):

$$s_n = \begin{cases} 1 - \alpha_n & \text{if } \sigma_n \leq TH_3 \\ 1.0 & \text{elsif } \sigma_n \leq TH_4 \\ 1 + \alpha_n & \text{otherwise} \end{cases} \qquad \text{Eq. (10)}$$

where $TH_3$ and $TH_4$ denote the threshold values. Specifically, if the frame level noise value $\sigma_n$ is equal or lower than $TH_3$, the modified weight $s_n$ can be $1-a_n$. If the frame level noise value $\sigma_n$ is higher than $TH_3$, but is equal to or lower than $TH_4$, then the modified weight $s_n$ can be 1; and when the frame level noise value $\sigma_n$ is higher than $TH_4$, then the modified weight $s_n$ can be $1+a_n$. In one example, $TH_3$ is equal to 1 and $TH_4$ is equal to 2. $a_n \in (0, 1.0)$ represents the adjusted noise factor. $a_n$ is a predetermined value. In an example, $a_n$ has a value of 0.6.

In another embodiment, filter strength and QP is further adjusted at block level of size B×B in pixels. For each non-overlapping B×B block, the signal to noise ratio for b th block is calculated, for example according to Eq. (11)

$$snr^b = \frac{\sum_{i=0}^{B^2-1} I_o^b(k)}{B^2 \times \sigma_n^2} \qquad \text{Eq. (11)}$$

where $I_o^b(i, k)$ denotes the k-th pixels which belongs to the b-th B×B block of the original picture $I_o$. The filter strength is further adjusted in accordance to Eq. (12):

$$s_{snr}^b = \begin{cases} 1 - \alpha_{snr} & \text{if } snr^b \leq TH_5 \\ 1.0 & \text{elseif } snr^b \leq TH_6 \\ 1 + \alpha_{snr} & \text{otherwise} \end{cases} \qquad \text{Eq. (12)}$$

where $TH_5$ and $TH_6$ denote the threshold values. In one example, $TH_5$ is equal to 25 and $TH_6$ is equal to 50; $a_{snr} \in (0, 1)$ is the SNR adjustment factor. In one example, $a_{snr}=0.2$ gives a good result.

Based on $snr^b$ value, the QP is adjusted according to Eq. (13):

$$QP^b = \begin{cases} QP - \alpha_{QP} & \text{if } snr^b \leq TH_7 \\ QP & \text{elseif } snr^b \leq TH_8 \\ QP + \alpha_{QP} & \text{otherwise} \end{cases} \qquad \text{Eq. (13)}$$

where $TH_7$ and $TH_8$ denote the threshold values. In an example, $TH_7$ is equal to 25 and $TH_8$ is equal to 50; $a_{QP} \in \mathbb{N}^+$ (e.g., positive integer) is the snr-based adjustment QP factor. In an example, $a_{QP}=1$.

In another embodiment, whether filtering a block is adaptively determined based on the complexity of the block. In some examples, a picture is divided to B×B (B is a positive integer) non-overlapped blocks, such as 8×8 (samples) blocks, 16×16 (samples) blocks, and the like. Characteristic of a B×B block is used to control TF filtering adaptively.

In some examples, a blank block has same value for all pixels in the blank block. In case of blank block, temporal filtering may not improve coding performance. Therefore, in an example, temporal filtering may be skipped for pixels in a blank block.

In another example, some blocks, such as relatively small blocks, may have small variance in pixel values. For a pixel in a small block with very small variance, a strong temporal filtering may cause significant distortion to the original pixels in the small block. In an example, a weight that is referred to as low contrast (LC) weight can be applied. In an example, the low contrast weight can be determined according to Eq. (14):

$$s_{lc}^b = \begin{cases} 0.5 & \text{if } (\text{max\_pix\_b} - \text{min\_pix\_b}) \leq TH_9 \\ 1 & \text{otherwise} \end{cases} \qquad \text{Eq. (14)}$$

where $TH_9$ denotes a threshold value, max_pix_b, min_pix_b represents the maximum and minimum pixel value in a bth non-overlap B×B block. In one example, TH is equal to 5.

According to an embodiment of the disclosure, when weights $s_n$, $s_{snr}^b$, $s_{lc}^b$ are considered, the bilateral weight is set as Eq. (15):

$$w_r(i, a, k) = bw \cdot s_o \cdot s_n \cdot s_{snr}^b \cdot s_{lc}^b \cdot s_r(i, a) \cdot e^{-\frac{\Delta I(i,k)^2}{sw \cdot \sigma_l(QP^b)^2}} \qquad \text{Eq. (15)}$$

In another embodiment, the number of reference frames is adaptively determined based on whether the reference frames belong to a same scene.

Temporal filtering is effective in handling various video contents of slow and fast motion. However, because picture frames from difference scene are most likely to be different, thus temporal filtering may not be efficient to use pictures from difference scenes to filter TF frame. Thus, in some embodiments, temporal filtering is not used across scene cut. The reference range can be adjusted according to scene cut.

Figure 14:
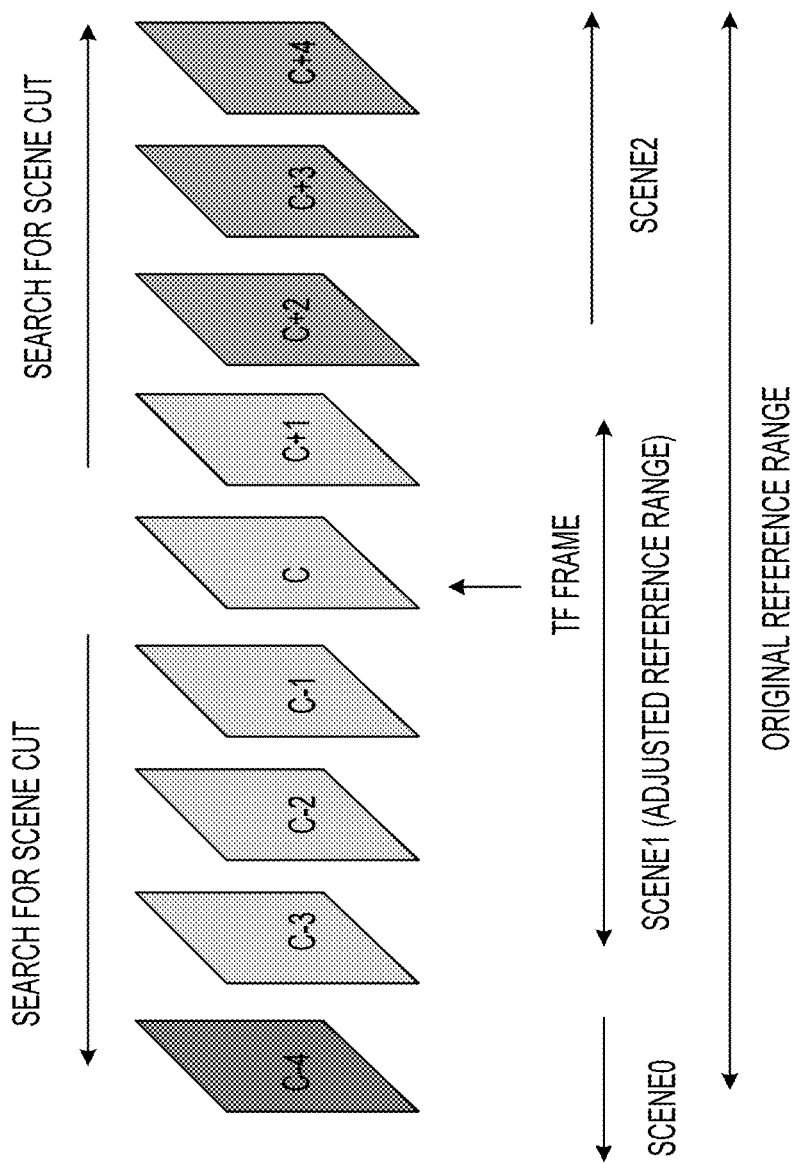
FIG. 14 shows an example of adjusting reference range based on scene cut according to some embodiments of the disclosure.

FIG. 14 shows an example of adjusting reference range based on scene cut according to some embodiments of the disclosure. In the FIG. 14 example, the original reference range includes 4 frames before the TF frame and 4 frames after the TF frame. For example, when the picture order count (POC) for the TF frame is C, the 4 frames before the TF frame have POC from C−1 to C−4, and the 4 frames after the TF frame have POC from C+1 to C+4.

In some examples, scene cut detection is performed in forward and backward directions starting from the TF frame according to picture order count. Then, the frames in the same scene as the TF frame are determined to be the reference frames for the TF frame. In the FIG. 14 example, three scenes (scene0, scene1 and scene2) are detected. The first scene scene0 includes C−4 frame, the second scene scene1 includes C−3 to C+1 frames, and the third scene scene2 includes C+2 to C+4 frames. Frames C−3, C−2, C−1 and C+1 are in the same scene as the TF frame and can be used as reference frames for the TF frame, thus the adjusted reference range is from C−3 frame to C+1 frame excluding the TF frame itself. Frames from other scenes, such as C−4 frame in the first scene scene0, and C+2 to C+4 frames in the third scene scene2 can be marked as not available during temporal filtering process.

According to another aspect of the disclosure, non co-located pixels can be used in temporal filtering. In some examples, beside the co-located pixels in motion compensated reference frames, the temporal filtering may use additional non co-located pixels in the motion compensated reference frame to determine an average, such as adding non co-located pixels in Eq. (1).

In some examples, additional points from a motion compensated reference frame are used in temporal filtering. In an example, the co-located pixel in the rth motion compensated reference frame is located at location (x, y) (also referred to as spatial location k), the additional non co-located pixels can have location (x±Δx, y±Δy) (also referred to as spatial locations $k_r$) in the rth motion compensated reference picture. In an example, Δx, Δy are set to 1.

In some examples, patterns of non co-located pixels are defined.

Figure 15:
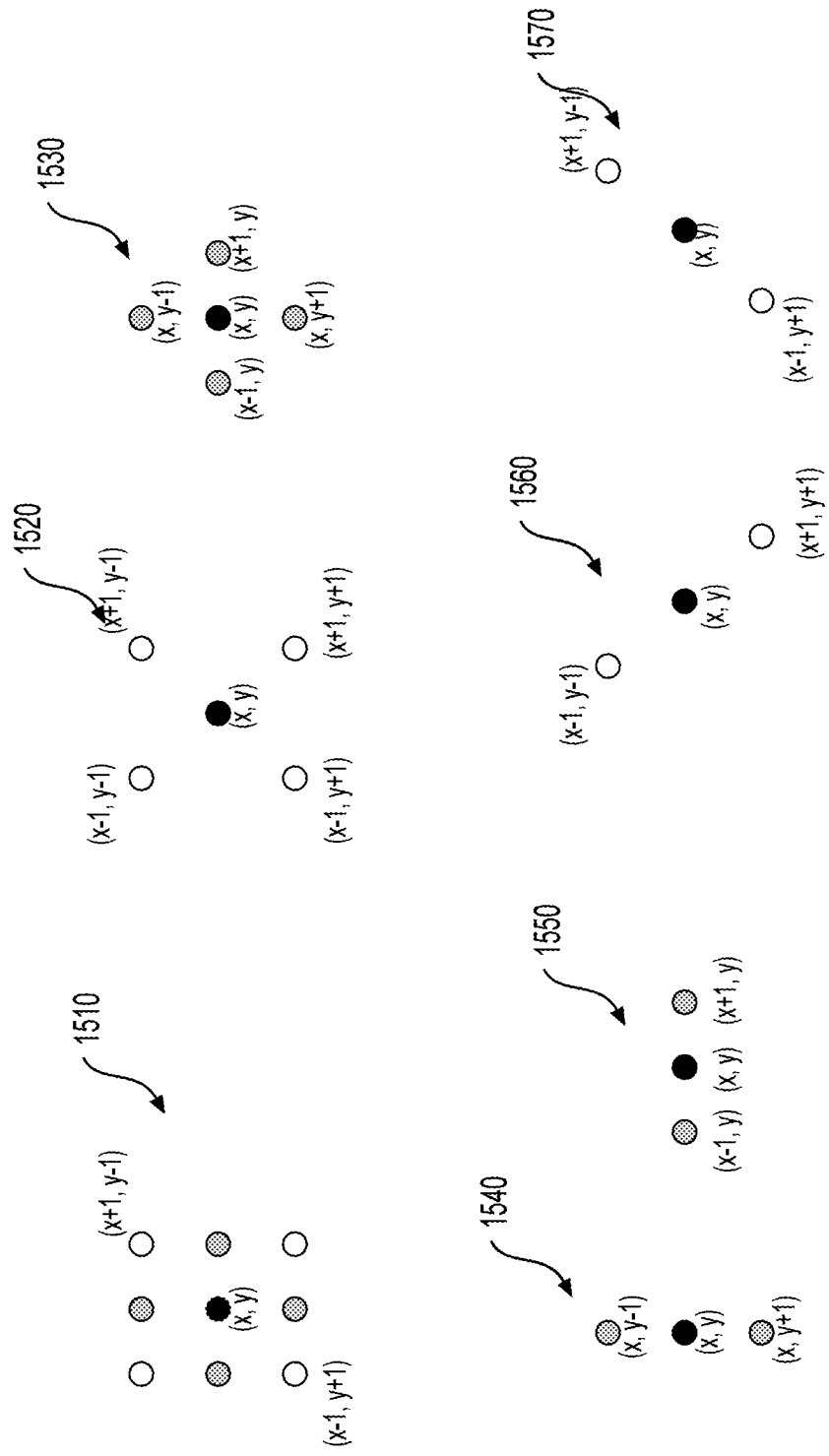
FIG. 15 shows examples of patterns for non co-located pixels.

FIG. 15 shows examples of patterns for non co-located pixels. In FIG. 15, pattern (1510) includes 8 points neighboring to the co-located pixel as shown in FIG. 15; pattern (1520) includes 4 points neighboring to the co-located pixel as shown in FIG. 15; pattern (1530) includes 4 points neighboring to the co-located pixel as shown in FIG. 15; pattern (1540) includes 2 points neighboring to the co-located pixel in vertical direction as shown in FIG. 15; pattern (1550) includes 2 points neighboring to the co-located pixel in horizontal direction as shown in FIG. 15; pattern (1560) includes 2 points neighboring to the co-located pixel in a diagonal direction as shown in FIG. 15; pattern (1570) includes 2 points neighboring to the co-located pixel in another diagonal direction as shown in FIG. 15.

Figure 16:
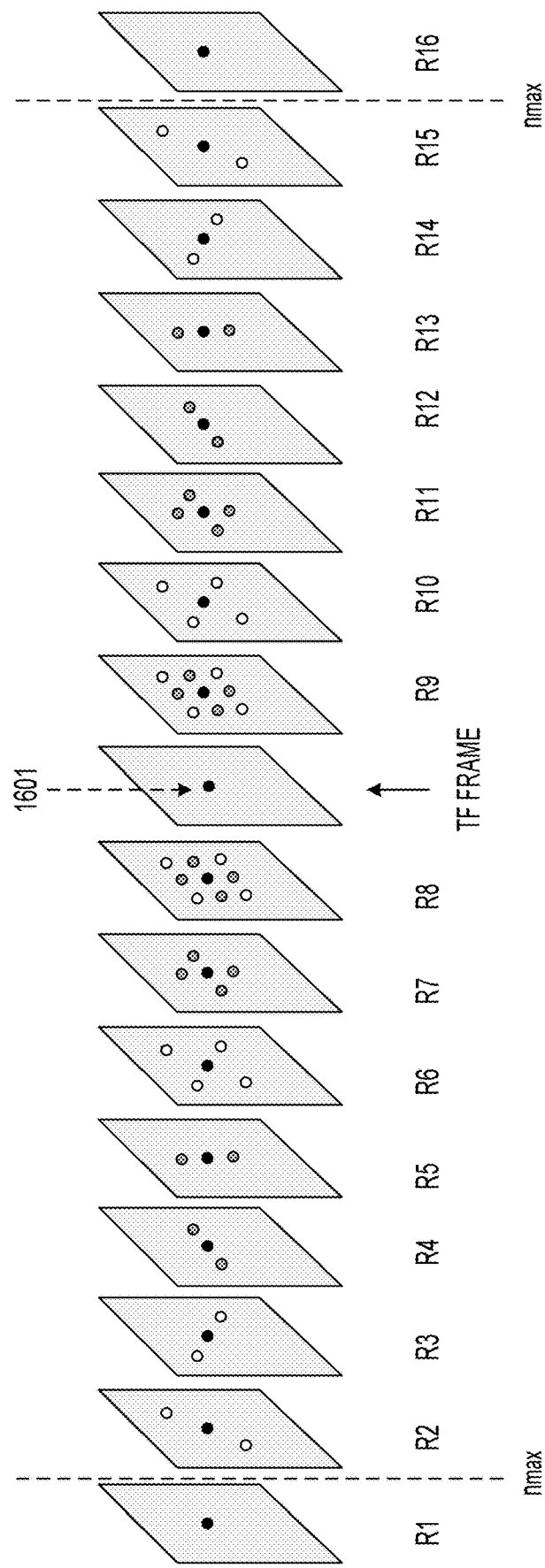
FIG. 16 shows an example of using non co-located pixels for temporal filtering according to some embodiments of the disclosure.

FIG. 16 shows an example of using non co-located pixels for temporal filtering according to some embodiments of the disclosure. In the FIG. 16 example, motion compensated reference frames R1-R16 are derived for the TF frame. For a pixel (1601) in the TF frame, the temporal filter can use co-located pixels in the motion compensated reference frames R1-R16 and neighboring non co-located pixels in the motion compensated reference frames R1-R16 to determine the filtered value for the pixel (1601). In FIG. 16, the co-located pixels in the motion compensated reference frames R1-R16 are shown in black, and neighboring non co-located pixels in the motion compensated reference frames R1-R16 are shown in grey and white. Different motion compensated reference frames can use different patterns of non co-located pixels. For example, only co-located pixel in the motion compensated reference frame R1 is used in the temporal filter; non co-located pixels in the motion compensated reference frame R2 form the pattern (1570); non co-located pixels in the motion compensated reference frame R3 form the pattern (1560); non co-located pixels in the motion compensated reference frame R4 form the pattern (1550); non co-located pixels in the motion compensated reference frame R5 form the pattern (1540); non co-located pixels in the motion compensated reference frame R6 form the pattern (1520); non co-located pixels in the motion compensated reference frame R7 form the pattern (1530); non co-located pixels in the motion compensated reference frame R8 form the pattern (1510); non co-located pixels in the motion compensated reference frame R9 form the pattern (1510); non co-located pixels in the motion compensated reference frame R10 form the pattern (1520); non co-located pixels in the motion compensated reference frame R11 form the pattern (1530); non co-located pixels in the motion compensated reference frame R12 form the pattern (1550); non co-located pixels in the motion compensated reference frame R13 form the pattern (1540); non co-located pixels in the motion compensated reference frame R14 form the pattern (1560); non co-located pixels in the motion compensated reference frame R15 form the pattern (1570); and only co-located pixel in the motion compensated reference frame R16 is used in the temporal filter.

Specifically, in some examples, more non co-located pixels are used for smaller temporal distance. Each pattern has a set of non co-located pixels, and the number of non co-located pixels is denoted by $m_p$, and the pattern can be repeated 0, . . . , $n_p$ times in the motion compensated reference frames, where $n_p \leq a$. In an example, the pattern formed by the non co-located pixels in a motion compensated reference frame for use in the temporal filter is one of the patterns in FIG. 15.

In an example, a parameter $n_{max}$ defines the maximum reference range in which non-local pixels can be used. Beyond the maximum reference range, only co-located pixel in a motion compensated frame is used by the temporal filter for determined the filtered value for the pixel (1601).

In some examples, some patterns are associated as pairs. For example, the pattern (1520) and the pattern (1530) are associated as four points pair; the pattern (1540) and the pattern (1550) are associated as vertical and horizontal pair; the pattern (1560) and pattern (1570) are associated as diagonal pair. In an example, a pair of patterns can be used at adjacent motion compensated reference frames, such as at motion compensated reference frames Ri and Ri+1. For example, the diagonal pair are used respectively at R2 and R3, the vertical and horizontal pair are used respectively at R4 and R5 in FIG. 16. In another example, a pair of patterns can be used at motion compensated reference frames symmetric to the TF frame, such as TF±i. For example, the four points pair are used respectively at R7 (TF−2) and R10 (TF+2) in FIG. 16.

In some embodiments, a non-local (nl) weight is used to adjust the filter strength for the non-local pixels at spatial location $k_i$ in ith motion compensated reference frame, the non local (nl) weight is denoted as $s_{nl}(i, k_i)$. In some examples, to reduce the complexity of bilateral filtering, a non-local reference pixel can be removed (e.g., not taking into calculation for filtering, having zero as the non-local weight) when a pixel difference (between the non local reference pixel in the motion compensated reference frame and the pixel to filter in the TF frame) is larger than a given threshold, such as represented by $\Delta I(i, k, k_i)^2 > TH_{10}$, where $\Delta I(i, k, k_i)$ denotes the pixel difference between a non local reference pixel at spatial location $k_i$ in ith motion compensated reference frame and the pixel (at the spatial location k) to filter in the TF frame, and $TH_{10}$ is a threshold value. In an example, the non-local weight $s_{nl}(i, k_i)$ is determined according to Eq. (16)

$$s_{nl}(i, k_i) = \begin{cases} 1 & \text{if } \Delta I(i, k, k_i)^2 \leq TH_{10}, k = k_i \\ 0.8 & \text{elseif } \Delta I(i, k, k_i)^2 \leq TH_{10}, k \neq k_i \\ 0 & \text{elseif } \Delta I(i, k, k_i)^2 > TH_{10}, k \neq k_i \end{cases} \quad \text{Eq. (16)}$$

In an example, $TH_{10}=2^{bit\_depth} \gg 4$, where bit_depth represents the bit depth of input (e.g., original, uncompressed) video sequence.

In some embodiments, parameters for the non co-located reference pixels, such as a selection of a pattern based on a number of points (e.g., $m_p$) in the pattern, a number of repeating usages of the pattern (e.g., $n_p$), a maximum range (e.g., $n_{max}$), and the like can be used to control the complexity of using non co-located reference pixels for temporal filtering.

In some embodiments, a filtered value for a pixel at the spatial location k in the TF frame can be calculated according to Eq. (17) instead of Eq. (1):

$$I_n(k) = \frac{I_o(k) + \sum_{i=0}^{2 \times a-1} \left( \sum_{k_i=0}^{m_p^i} w_r(i, a, k, k_r) I_r(i, k_i) \right)}{1 + \sum_{i=0}^{2*a-1} w_r(i, a, k, k_i)} \quad \text{Eq. (17)}$$

where $I_r(i, k_i)$ is the $k_i$ th pixel in ith motion compensated reference picture; $m_p^i$ is the number of pixels in ith motion compensated reference picture. $w_r(i, a, k, k_i)$ denotes the weights of pixels as described in Eq. (18)

$$w_r(i, a, k, k_i) = bw \cdot s_o \cdot s_n \cdot s_{snr}^b \cdot s_{lc}^b \cdot s_{nl}(i, k_i) \cdot s_r(i, a) \cdot e^{-\frac{\Delta I(i,k,k_i)^2}{sw \cdot \sigma_l (QP^b)^2}} \quad \text{Eq. (18)}$$

$\Delta I (i, k, k_i)$ represents the pixel difference between the original TF picture at kth spatial location and pixel at $k_i$ spatial location at ith motion compensated reference picture.

It is noted that Eq. (18) includes various weights corresponding to weight change factors, such as $s_n$ for noise level induced weight, $s_{snr}^b$ for block level signal to noise ratio induced weight, $s_{lc}^b$ for block level low contrast induced weight, and $s_{nl}(i, k_i)$ for weight for non co-located pixels. When a weight change factor is not considered, the corresponding weight can be set to 1, in an example.

Figure 17:
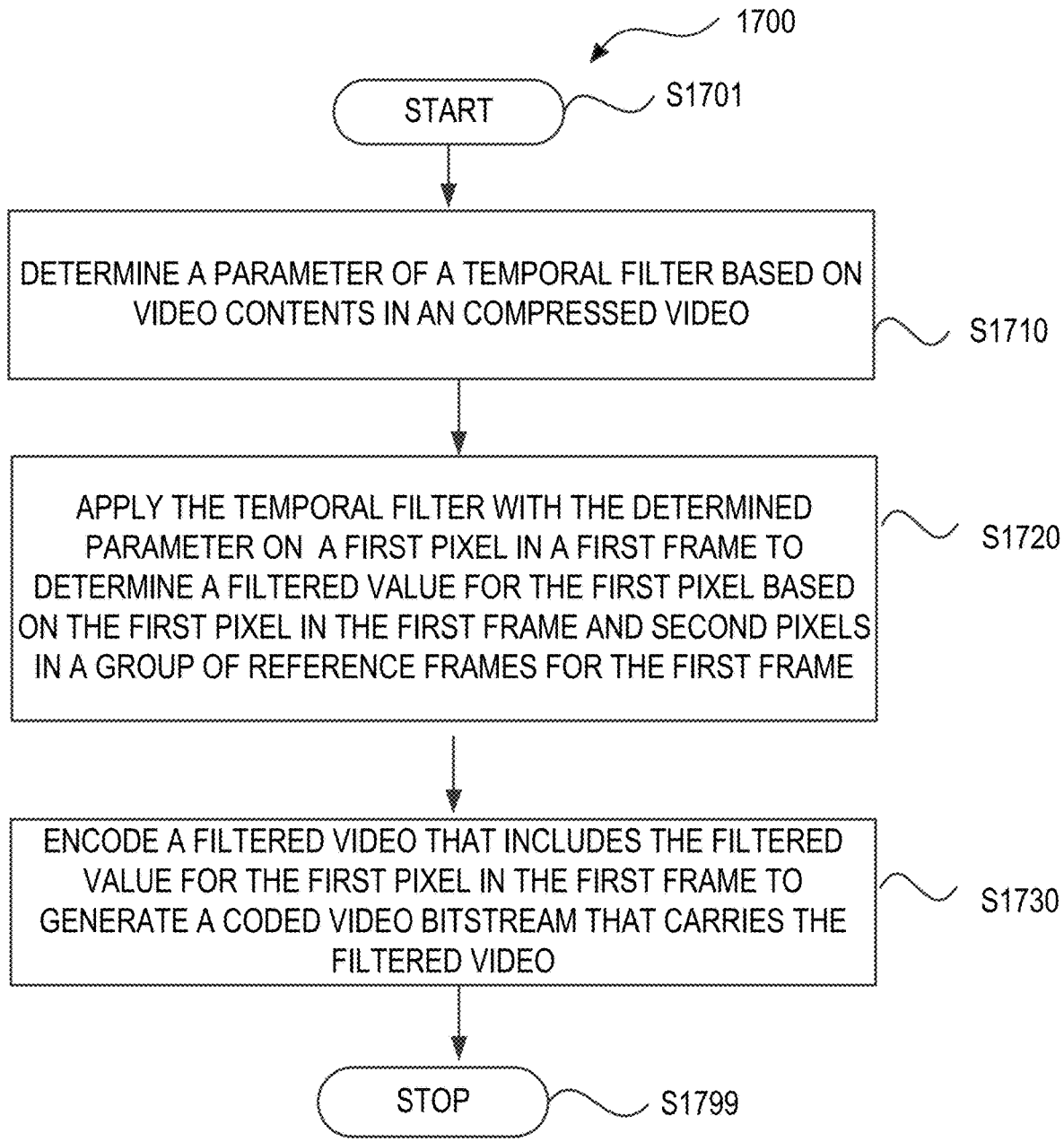
FIG. 17 shows a flow chart outlining a process according to an embodiment of the disclosure.

FIG. 17 shows a flow chart outlining a process (1700) according to an embodiment of the disclosure. The process (1700) can be used in video processing. In various embodiments, the process (1700) are executed by processing circuitry, such as the processing circuitry in the encoding device (901). In some embodiments, the process (1700) is implemented in software instructions, thus when the processing circuitry executes the software instructions, the processing circuitry performs the process (1700). The process starts at (S1701) and proceeds to (S1710).

At (S1710), one or more parameters of a temporal filter are determined based on video contents in an uncompressed video. The uncompressed video includes a sequence of frames (also referred to as pictures). In some examples, the one of more parameters of the temporal filter includes at least one of a number of reference frames in the group of reference frames, a filter strength, and an enabling/disabling decision of the temporal filter on a block including a first pixel in a first frame. The first frame is a to be temporal filtered frame, and the first pixel is a to be temporal filtered pixel. In some examples, the video contents can include at least one of a scene change, a noise level of a frame, a signal to noise ratio of a block, and a pixel variance in a block.

In an example, a number of reference frames in the group of reference frames is determined based on a noise level of the first frame.

In another example, a frame level filtering strength is determined based on a noise level of the first frame.

In another example, at least one of a filtering strength and a quantization parameter for a block that includes the first pixel can be based on a signal to noise ratio of the block.

In another example, an enabling/disabling decision for applying the temporal filter to a block in the first frame is determined based on a complexity of the block.

At (S1720), the temporal filter with the determined parameters is applied on a first pixel in a first frame to determine a filtered value for the first pixel based on the first pixel in the first frame and second pixels in a group of reference frames for the first frame. The first frame is a to be temporal filtered frame, and the first pixel is a to be temporal filtered pixel.

In some examples, a group of reference frames that are in a same scene as the first frame is determined. For a reference frame in the group of reference frames, a motion compensated reference frame is derived based on motion estimation between the reference frame and the first frame. Then, the filtered value for the first pixel is calculated at least partially based on a co-located pixel for the first pixel in the motion compensated reference frame.

Further in some examples, the filtered value for the first pixel is calculated based on at least a non co-located pixel for the first pixel in the motion compensated reference frame.

In an example, the filtered value is calculated based on a first number of non co-located pixels in a first motion compensated reference frame and a second number of non co-located pixels in a second motion compensated reference frame. The first motion compensated reference frame has a smaller temporal distance to the first frame than the second motion compensated reference frame, and the first number of non co-located pixels is larger than the second number of non co-located pixels.

At (S1730), a filtered video including the filtered value for the first pixel in the first frame is encoded to generate a coded video bitstream that carries the filtered video.

Then, the process proceeds to (S1799) and terminates.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
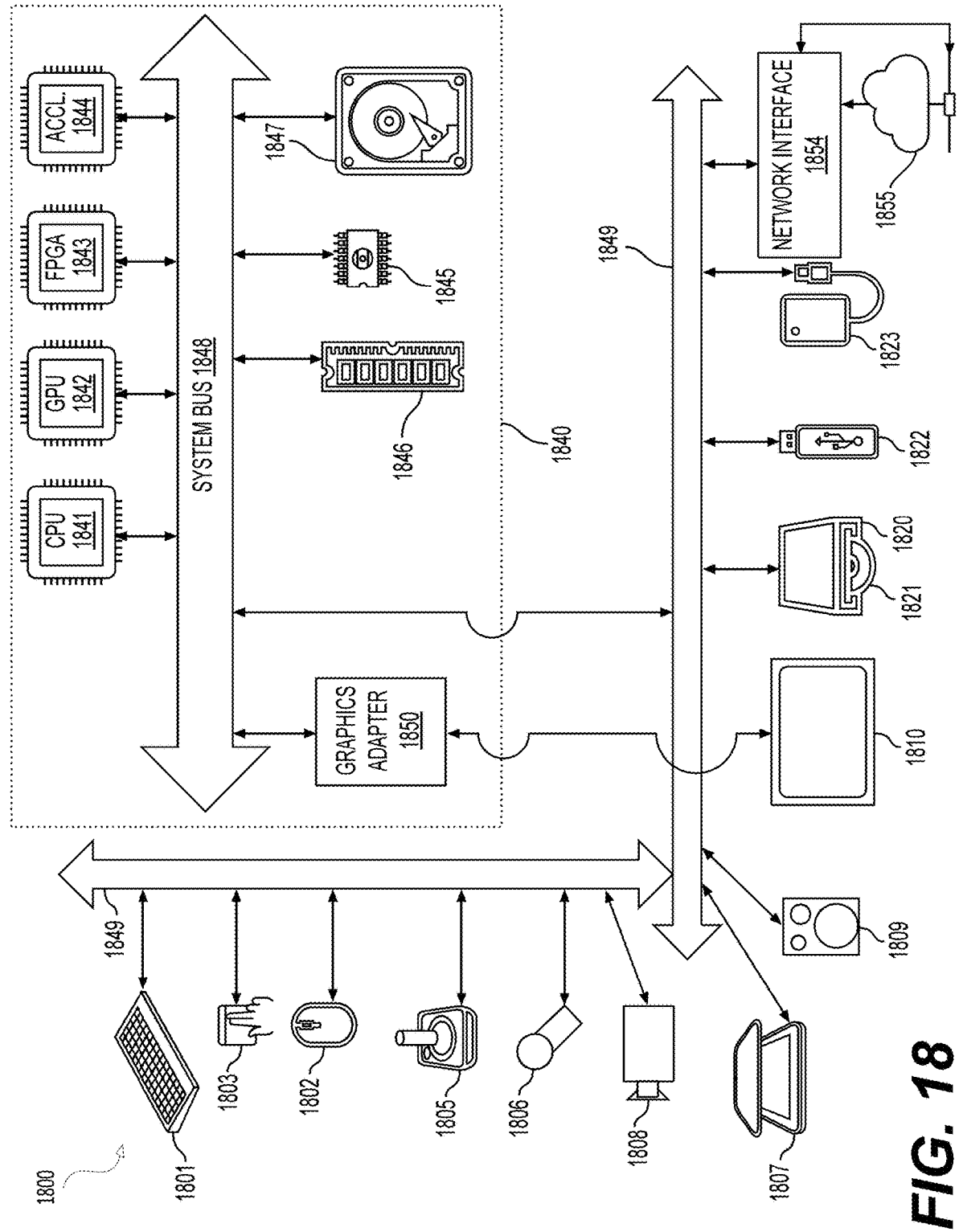
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hard-wired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video processing, comprising:
determining, by a processor, parameters of a temporal filter that include a filter strength of the temporal filter and low contrast (LC) weights for blocks of a first frame based on video contents in the first frame of an uncompressed video, the uncompressed video including a sequence of frames, the filter strength being determined based on a comparison between a noise level of the first frame and a plurality of threshold values, and the LC weights being determined based on a comparison between (i) a difference between minimum and maximum pixel values in a block of the first frame and (ii) a threshold value; and
applying, by the processor, the temporal filter with the determined parameters on a first pixel in the first frame to determine a filtered value for the first pixel based on the first pixel in the first frame and second pixels in a group of reference frames for the first frame.

2. The method of claim 1, further comprising:
encoding, by the processor, a filtered video that includes the filtered value for the first pixel in the first frame to generate a coded video bitstream that carries the filtered video.

3. The method of claim 1, wherein the parameters of the temporal filter include an enabling/disabling decision of the temporal filter on a block including the first pixel, and the video contents include at least one of a scene change, a noise level of a frame, a signal to noise ratio of a block, and a pixel variance in a block.

4. The method of claim 1, further comprising:
determining a number of reference frames in the group of reference frames based on the noise level of the first frame.

5. The method of claim 1, further comprising:
determining a frame level filtering strength based on the noise level of the first frame.

6. The method of claim 1, further comprising:
determining at least one of a filtering strength and a quantization parameter for a block that includes the first pixel based on a signal to noise ratio of the block.

7. The method of claim 1, further comprising:
making an enabling/disabling decision for applying the temporal filter to a block in the first frame based on a complexity of the block.

8. The method of claim 1, further comprising:
determining the group of reference frames that are in a same scene as the first frame;
deriving, for a reference frame in the group of reference frames, a motion compensated reference frame based on motion estimation between the reference frame and the first frame; and
determining the filtered value for the first pixel based on a co-located pixel for the first pixel in the motion compensated reference frame.

9. The method of claim 8, further comprising:
determining the filtered value for the first pixel based on at least a non co-located pixel for the first pixel in the motion compensated reference frame.

10. The method of claim 9, further comprising:
determining the filtered value based on a first number of non co-located pixels in a first motion compensated reference frame and a second number of non co-located pixels in a second motion compensated reference frame, the first motion compensated reference frame having a smaller temporal distance to the first frame than the second motion compensated reference frame, the first number of non co-located pixels being larger than the second number of non co-located pixels.

11. An apparatus for video processing, comprising processing circuitry configured to:

determine parameters of a temporal filter that include a filter strength of the temporal filter and low contrast (LC) weights for blocks of a first frame based on video contents in the first frame of an uncompressed video, the uncompressed video including a sequence of frames, the filter strength being determined based on a comparison between a noise level of the first frame and a plurality of threshold values, and the LC weights being determined based on a comparison between (i) a difference between minimum and maximum pixel values in a block of the first frame and (ii) a threshold value; and apply the temporal filter with the determined parameters on a first pixel in the first frame to determine a filtered value for the first pixel based on the first pixel in the first frame and second pixels in a group of reference frames for the first frame.

12. The apparatus of claim 11, wherein the processing circuitry is further configured to:

encode a filtered video that includes the filtered value for the first pixel in the first frame to generate a coded video bitstream that carries the filtered video.

13. The apparatus of claim 11, wherein the parameter of the temporal filter includes an enabling/disabling decision of the temporal filter on a block including the first pixel, and the video contents include at least one of a scene change, a noise level of a frame, a signal to noise ratio of a block, and a pixel variance in a block.

14. The apparatus of claim 11, wherein the processing circuitry is configured to:

determine a number of reference frames in the group of reference frames based on the noise level of the first frame.

15. The apparatus of claim 11, wherein the processing circuitry is configured to:

determine a frame level filtering strength based on the noise level of the first frame.

16. The apparatus of claim 11, wherein the processing circuitry is configured to:

determine at least one of a filtering strength and a quantization parameter for a block that includes the first pixel based on a signal to noise ratio of the block.

17. The apparatus of claim 11, wherein the processing circuitry is configured to:

make an enabling/disabling decision for applying the temporal filter to a block in the first frame based on a complexity of the block.

18. The apparatus of claim 11, wherein the processing circuitry is configured to:

determine the group of reference frames that are in a same scene as the first frame;

derive, for a reference frame in the group of reference frames, a motion compensated reference frame based on motion estimation between the reference frame and the first frame; and determine the filtered value for the first pixel based on a co-located pixel for the first pixel in the motion compensated reference frame.

19. The apparatus of claim 18, wherein the processing circuitry is configured to:

determine the filtered value for the first pixel based on at least a non co-located pixel for the first pixel in the motion compensated reference frame.

20. The apparatus of claim 19, wherein the processing circuitry is configured to:

determine the filtered value based on a first number of non co-located pixels in a first motion compensated reference frame and a second number of non co-located pixels in a second motion compensated reference frame, the first motion compensated reference frame has a smaller temporal distance to the first frame than the second motion compensated reference frame, the first number of non co-located pixels is larger than the second number of non co-located pixels.

\* \* \* \* \*